(12) United States Patent
Maeda et al.

(10) Patent No.: US 10,442,323 B2
(45) Date of Patent: Oct. 15, 2019

(54) METHOD OF PRODUCING SEAT RECLINING APPARATUS

(71) Applicant: SHIROKI CORPORATION, Fujisawa-shi, Kanagawa (JP)

(72) Inventors: Noriaki Maeda, Fujisawa (JP); Hidehiko Fujioka, Fujisawa (JP)

(73) Assignee: SHIROKI CORPORATION, Fujisawa-shi, Kanagawa (JP)

(*) Notice: Subject to any disclaimer, the term of this patent is extended or adjusted under 35 U.S.C. 154(b) by 314 days.

(21) Appl. No.: 15/441,872

(22) Filed: Feb. 24, 2017

(65) Prior Publication Data

US 2017/0253152 A1 Sep. 7, 2017

(30) Foreign Application Priority Data

Mar. 4, 2016 (JP) ................. 2016-041903

(51) Int. Cl.
*B60N 2/23* (2006.01)
*B60N 2/20* (2006.01)
*B60N 2/235* (2006.01)

(52) U.S. Cl.
CPC ............ *B60N 2/2356* (2013.01); *B60N 2/20* (2013.01); *B60N 2/236* (2015.04); *B60N 2/2362* (2015.04); *Y10T 29/49002* (2015.01); *Y10T 29/49842* (2015.01); *Y10T 29/49845* (2015.01)

(58) Field of Classification Search
CPC .... B60N 2/2362; B60N 2/2356; B60N 2/236; B60N 2/20; Y10T 29/49842; Y10T 29/49845; Y10T 29/49002

USPC ........ 29/434, 436, 592; 297/367 P, 311, 340, 297/341, 342, 353, 354.1, 354.12
See application file for complete search history.

(56) References Cited

U.S. PATENT DOCUMENTS

| | | | | |
|---|---|---|---|---|
| 4,836,607 A | * | 6/1989 | Kluting | B60N 2/2252 16/341 |
| 7,950,742 B2 | * | 5/2011 | Endo | B60N 2/236 297/354.12 |
| 8,231,176 B2 | * | 7/2012 | Mitsuhashi | B60N 2/2252 297/366 |
| 9,320,358 B2 | * | 4/2016 | Maeda | A47C 1/024 |
| 2009/0250990 A1 | * | 10/2009 | Endo | B60N 2/236 297/367 P |

(Continued)

FOREIGN PATENT DOCUMENTS

JP 2013-132348 A 7/2013

*Primary Examiner* — Bayan Salone
(74) *Attorney, Agent, or Firm* — Buchanan Ingersoll & Rooney PC

(57) ABSTRACT

A method of producing a seat reclining apparatus includes connecting one of a first connecting portion and a second connecting portion of a biasing member to associated one of a base member and a lock drive member, with a lock member and the lock drive member supported on the base member, thereby bringing the biasing member to a temporarily held state; mounting the ratchet to the base member so as to cover the biasing member in the temporarily held state; and fixing the other of the first connecting portion and the second connecting portion to the other of the base member and the lock drive member through an opening which is formed in one of the base member and the ratchet, thereby bringing the biasing member to the biasing state from the temporarily held state.

4 Claims, 12 Drawing Sheets

(56) References Cited

U.S. PATENT DOCUMENTS

| | | | | |
|---|---|---|---|---|
| 2009/0289488 A1* | 11/2009 | Mitsuhashi | ......... | B60N 2/2227 |
| | | | | 297/354.12 |
| 2010/0117429 A1* | 5/2010 | Mitsuhashi | ......... | B60N 2/2252 |
| | | | | 297/354.12 |
| 2010/0269615 A1* | 10/2010 | Endou | ................. | B60N 2/2356 |
| | | | | 74/409 |
| 2011/0012414 A1* | 1/2011 | Yamada | ................ | B60N 2/236 |
| | | | | 297/367 P |
| 2014/0077559 A1* | 3/2014 | Higashi | ................ | B60N 2/235 |
| | | | | 297/354.1 |
| 2014/0091607 A1* | 4/2014 | Maeda | ................ | B60N 2/2356 |
| | | | | 297/354.12 |

\* cited by examiner

METHOD OF PRODUCING SEAT RECLINING APPARATUS

BACKGROUND OF THE INVENTION

1. Field of the Invention

The present invention relates to a method of producing a seat reclining apparatus which is installed in a seatback-angle adjustable reclining seat.

2. Description of the Related Art

A type of reclining apparatus including: a base plate (lower arm) which is fixed to one of a seat cushion frame and a seatback frame; a ratchet plate (upper arm) which is fixed to the other of the seat cushion frame and the seatback frame and provided on the inner periphery thereof with an annular internal gear (toothed portion); and pawls (a plurality of pawls are often provided at different positions in the circumferential direction) which are supported to be movable relative to the base plate in radial directions of the base plate, wherein the reclining seat is brought into a locked state, in which the ratchet plate and the base plate are prevented from rotating relative to each other, by bringing the outer toothed portion which is formed on each pawl into mesh with the annular internal gear of the ratchet plate, is widely known in the art as a seat reclining apparatus provided between a seat cushion side frame and a seatback side frame of a reclining seat.

More specifically, each pawl can move between an engaged position in which the outer toothed portion of the pawl is engaged with the internal gear of the ratchet plate and a disengaged position in which the outer toothed portion of the pawl is disengaged from the internal gear of the ratchet plate. A rotational member which can be rotationally operated is supported on the base plate, and a rotational force of the rotational member is converted into a radial force via a cam or the like to be transmitted to each pawl to move each pawl between the engaged position and the disengaged position. The seat reclining apparatus is provided with a biaser which biases the rotational member in a direction (locking direction) to move each pawl to the engaged position, and the locked state in which each pawl (the outer toothed portion thereof) and the ratchet (the internal gear thereof) are engaged is retained by the biasing force of the biaser in a state where the rotational member is not operated from the outside. Rotating the rotational member against the biasing force of the biaser causes each pawl to move to the disengaged position, thus allowing the reclining seat to move to an unlocked state.

A type of seat reclining apparatus in which spring members serving as biaser that provides a biasing force for bringing a reclining seat to a locked state (such as the aforementioned locked state) are arranged in an internal space between a base plate and a ratchet plate is known in the art (this type of seat reclining apparatus is disclosed in, e.g., Japanese Unexamined Patent Publication No. 2013-132348). In this type of seat reclining apparatus, it is difficult to install the spring members into the internal space from the outside after the base plate and the ratchet plate are combined. Therefore, the seat reclining apparatus is often produced by mounting each pawl and the spring members onto the base plate at a stage before the installation of the ratchet plate to the base plate, and thereafter installing the ratchet plate to the base plate to close the internal space.

When the ratchet plate is installed to the base plate, each pawl is brought closer toward the disengaged position than the engaged position in order to be prevented from interfering with the ratchet plate. In the type of seat reclining apparatus in which biasing spring members are installed before the installation of the ratchet plate, the spring members are already in an operating (biased) state at this stage, enabling the biasing force thereof to act, which causes a load against bringing each pawl closer toward the disengaged position than the engaged position. Additionally, when installing the spring members, there is a problem with each resiliently deformed spring member easily coming off due to a load being exerted on each spring member in a state where a side thereof is not covered by the ratchet plate. Accordingly, the following series of operations are required: an operation to install each spring member while holding each spring member from one side so as not to come off, an operation to move each pawl toward the disengaged position (to move the rotational member in the unlocking direction) against the biasing force of the associated spring member and then an operation to install the ratchet plate to the base plate, which is troublesome. In other words, the degree of difficulty in assembling the seat reclining apparatus is high.

SUMMARY OF THE INVENTION

The present invention has been devised in view of the above described problems and provides a method of producing a seat reclining apparatus, for use in a seatback-angle adjustable reclining seat, in which at least one biasing member (biaser) is installed, wherein this method improves the workability of assembling the seat reclining apparatus.

According to an aspect of the present invention, a method of producing a seat reclining apparatus is provided, which enables an angle of a seatback of a reclining seat relative to a seat cushion of the reclining seat to be adjusted, the seat reclining apparatus including a base member which is provided on one of the seat cushion and the seatback; a ratchet which is provided on the other of the seat cushion and the seatback and allowed to rotate relative to the base member and has a meshing portion; a lock member which is supported by the base member so as to be movable between an engaged position, in which the lock member is engaged with the meshing portion of the ratchet, and a disengaged position, in which the lock member is disengaged from the meshing portion of the ratchet; a lock drive member configured to operate selectively in a locking direction to move the lock member to the engaged position and an unlocking direction to move the lock member to the disengaged position in accordance with rotation of a rotational shaft member; and a biasing member which includes a first connecting portion and a second connecting portion which are fixed to the base member and the lock drive member, respectively, and biases the lock drive member in the locking direction in a biasing state in which the first connecting portion and the second connecting portion are fixed to the base member and the lock drive member, respectively, wherein the angle of the seatback relative to the seat cushion varies by rotation of the ratchet relative to the base member. The method of producing a seat reclining apparatus includes connecting one of the first connecting portion and the second connecting portion to associated one of the base member and the lock drive member, with the lock member and the lock drive member supported on the base member, thereby bringing the biasing member to a temporarily held state; mounting the ratchet to the base member so as to cover the biasing member in the temporarily held state; and fixing the other of the first connecting portion and the second connecting portion to the other of the base member and the lock drive member through an opening which is formed in one of the base member and the ratchet, thereby bringing the biasing member to the biasing state from the temporarily held state.

When the biasing member is installed, it is desirable to perform the following steps: connecting the first connecting portion to the base member when making the biasing member to a temporarily held state, and fixing the second connecting portion to the lock drive member when making the biasing member from the temporarily held state to the biasing state. In the case where each of the base member and the ratchet is provided with a through-hole through which the rotational shaft member is inserted, it is advisable to use the through-hole of one of the base member and the ratchet as an opening for use in fixing work to fix the second connecting portion to the lock drive member to move the biasing member to the biasing state.

The present invention is applicable to a method of producing a seat reclining apparatus provided with a biasing member(s) in any form. As an example of the biasing member, it is desirable for the biasing member to be a spring provided with a curved portion having a curved wire shape which varies a curvature thereof when resiliently deformed. The first connecting portion and the second connecting portion are provided at one end and the other end of the curved portion. The lock drive member is provided with a shaft coupling hole into which the rotational shaft member is inserted in a manner such that the rotational shaft member is capable of rotating integrally with the lock drive member, and the lock drive member is provided with an engaging portion which is formed as a depression that is open to an inner periphery of the shaft coupling hole, and to which the second connecting portion of the biasing member is fixed. The connecting, by which the biasing member is brought to the temporarily held state, includes inserting the second connecting portion into the shaft coupling hole at a position other than a position of the engaging portion.

In the method of producing a seat reclining apparatus, the connecting, by which the biasing member is brought to the temporarily held state, may include retaining the curved portion of the biasing member via an intermediate retaining portion which is provided on the lock drive member.

According to the method of producing a seat reclining apparatus of the present invention, a load of the biasing member is not caused in the temporarily held state at the stage of installing the ratchet, and the ratchet prevents the biasing member from coming off at the stage of moving the biasing member to an operating state (i.e., the stage of enabling the biasing member to act), so that no troublesome operation is required at each of the aforementioned two stages, which makes it possible to achieve excellent assembling workability because one of the first connecting portion and the second connecting portion is connected to an associated one of the base member and the lock drive member with the lock member and the lock drive member supported by the base member, to thereby bring the biasing member to a temporarily held state, and subsequently the other of the first connecting portion and the second connecting portion is fixed to the other of the base member and the lock drive member to thereby bring the biasing member to the biasing state from the temporarily held state after the ratchet is mounted to the base member.

The present disclosure relates to subject matter contained in Japanese Patent Application No. 2016-41903 (filed on Mar. 4, 2016) which is expressly incorporated herein by reference in its entirety.

BRIEF DESCRIPTION OF DRAWINGS

The present invention will be discussed below in detail with reference to the accompanying drawings, in which.

DESCRIPTION OF THE EMBODIMENT

The present invention will be hereinafter discussed with reference to the accompanying drawings. The leftward and rightward directions in the following description correspond to the directions shown by the arrows "LEFT" and "RIGHT", respectively, shown in FIGS. 2 and 7. In a seat reclining apparatus 15 according to the present invention which will be discussed later, the term "right side" refers to the vehicle exterior side and the term "left side" refers to the vehicle interior side. In addition, the term "inner peripheral side" refers to the radial center side (radially inner side) of the seat reclining apparatus 15 and the term "outer peripheral side" refers to the radially opposite side of the seat reclining apparatus 15 from the radial center side thereof.

Figure 1:
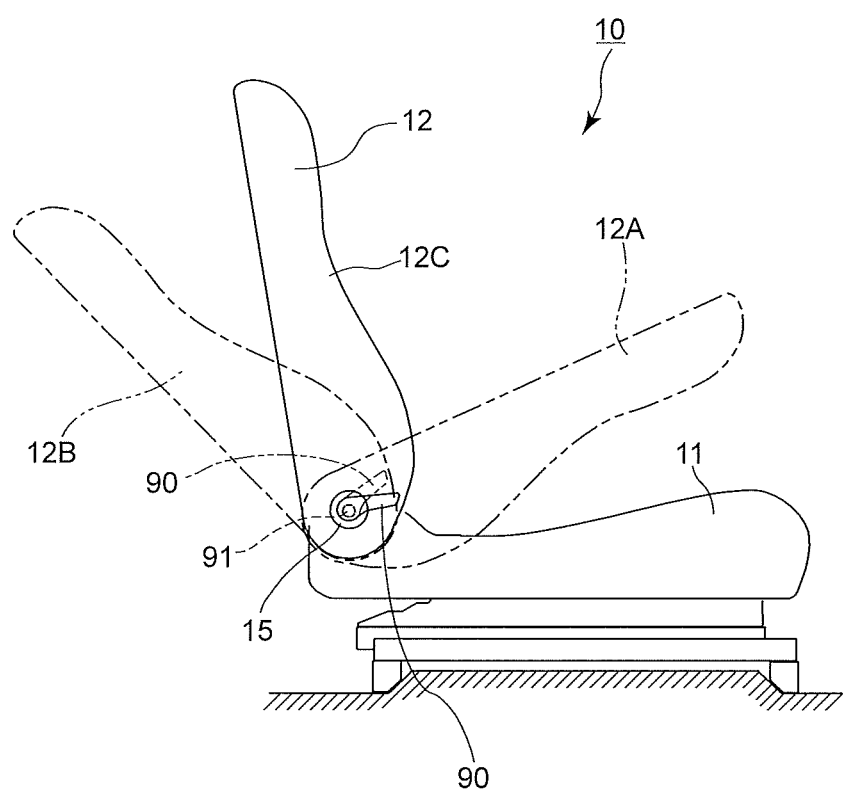
FIG. 1 is a side elevational view of a reclining seat equipped with a seat reclining apparatus according to the present invention.

A reclining seat 10 for vehicle shown in FIG. 1 is a right-side seat (with respect to the direction in which the vehicle moves) and is provided with a seat cushion 11 which is supported by a vehicle interior floor of a vehicle (e.g., an automobile) via a seat rail, and a seatback 12 which is tiltable relative to (pivoted at) the rear of the seat cushion 11. The reclining seat 10 is provided thereinside with a forward-tilting biasing spring (not shown) which rotationally biases the seatback 12 forward with respect to the seat cushion 11.

The vehicle seat 10 is provided inside the seat cushion 11 with a pair of left and right seat cushion frames (not shown). The vehicle seat 10 is provided at the back of the seat cushion 11 with a pair of left and right rear frames (not shown) in a fixed state which project upward. The vehicle seat 10 is provided inside the seatback 12 with a pair of left and right seatback frames (not shown). The pair of left and right seatback frames are positioned between the left and right rear frames, and the left seatback frame and the left rear frame face against each other in the leftward and rightward directions (vehicle widthwise direction) and the right seatback frame and the right rear frame face against each other in the leftward and rightward directions. On the left side (vehicle interior side) of the reclining seat 10, the left rear frame and the left seatback frame are rotatably connected via a rotational connection shaft (not shown). On the other hand, the reclining seat 10 is provided, on the right side (vehicle exterior side) of the reclining seat 10 that can be seen in FIG. 1, with a seat reclining apparatus 15 between the right rear frame and the right seatback frame to thereby connect each other thereat in a manner to allow the right rear frame and the right seatback frame to rotate about an axis extending in the leftward and rightward direction. The seatback 12 is rotatable about the aforementioned rotational connection shaft and the seat reclining apparatus 15 relative to the seat cushion 11. Specifically, the seatback 12 is rotatable between a forwardly-tilted position shown by a two-dot chain line designated by 12A in FIG. 1 and a rearward-tilted position shown by a two-dot chain line designated by 12B in FIG. 1. The position of the seatback 12 shown by a solid line designated by 12C is a first-stage (initial-stage) locked position at which the seatback 12 is prevented from tilting by the seat reclining apparatus 15. The section ranging from the first-stage locked position 12C to the forwardly-tilted position 12A is a freely tiltable section in which the seatback 12 is not locked (in which the seat reclining apparatus 15 is in an unlocked-state holding state which will be discussed later), while the section ranging from the first-stage locked position 12C to the rearward-tilted position 12B is a lock operating section in which the seatback 12 can be tilted (i.e., the angle of the seatback 12 can be adjusted relative to the seat cushion 11) only when an unlocking operation is performed on the seat reclining apparatus 15.

Figure 2:
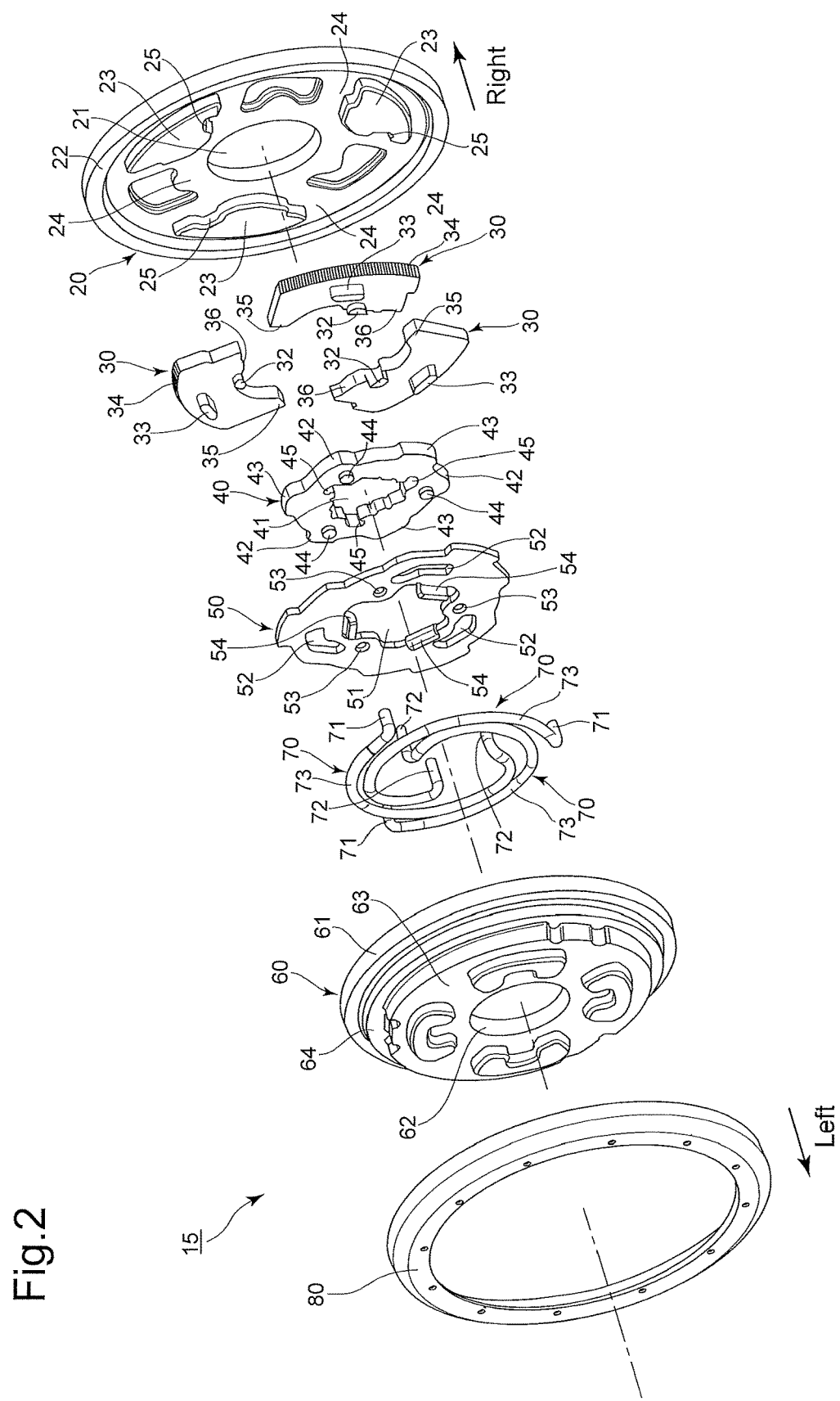
FIG. 2 is an exploded perspective view of the seat reclining apparatus that constitutes a component of the reclining seat.

Subsequently, the detailed structure of the first embodiment of the seat reclining apparatus 15 will be hereinafter discussed. As shown in FIG. 2, the seat reclining apparatus 15 is provided with a base plate (base member) 20, three pawls (lock members) 30, a rotational cam (lock drive member) 40, a release plate (lock drive member) 50, a ratchet plate (ratchet) 60, three lock springs (biasing members/springs) 70 and a retaining ring 80, which are major elements of the seat reclining apparatus 15.

Figure 7:
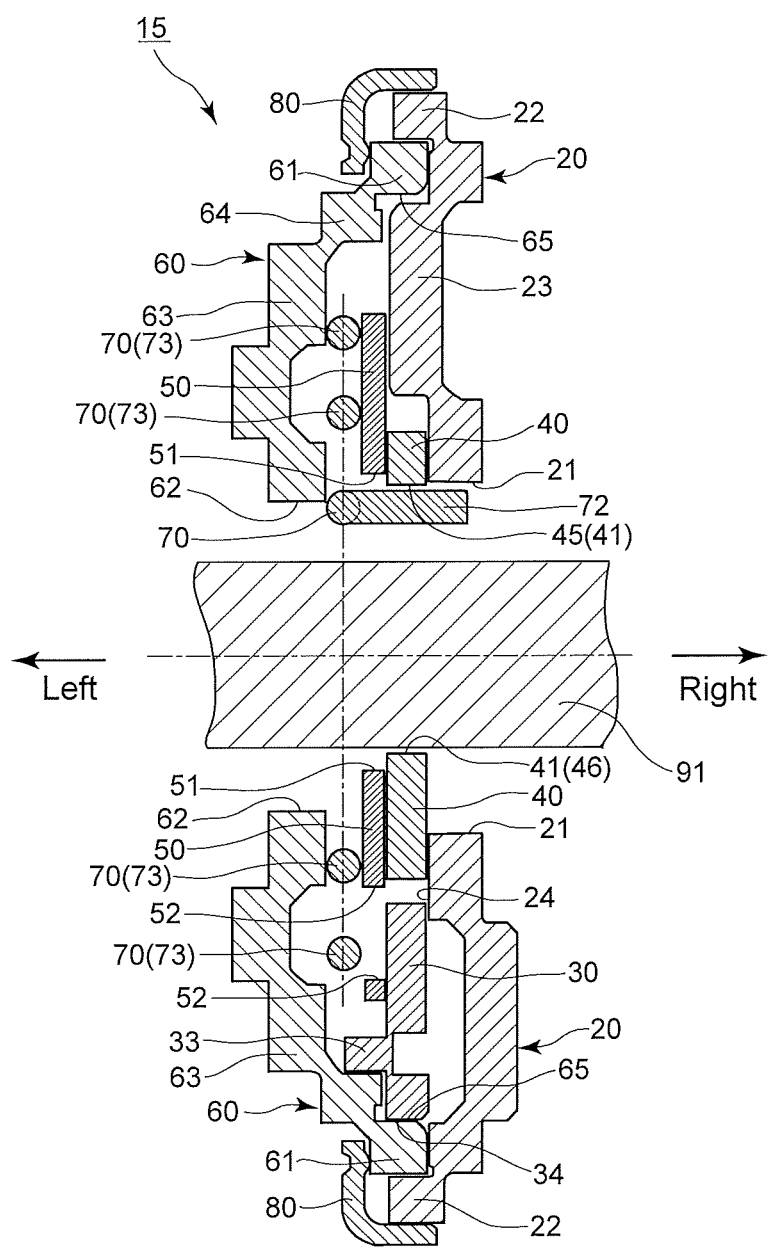
FIG. 7 is a sectional view taken along the line VII-VII shown in FIG. 6.
Figure 11:
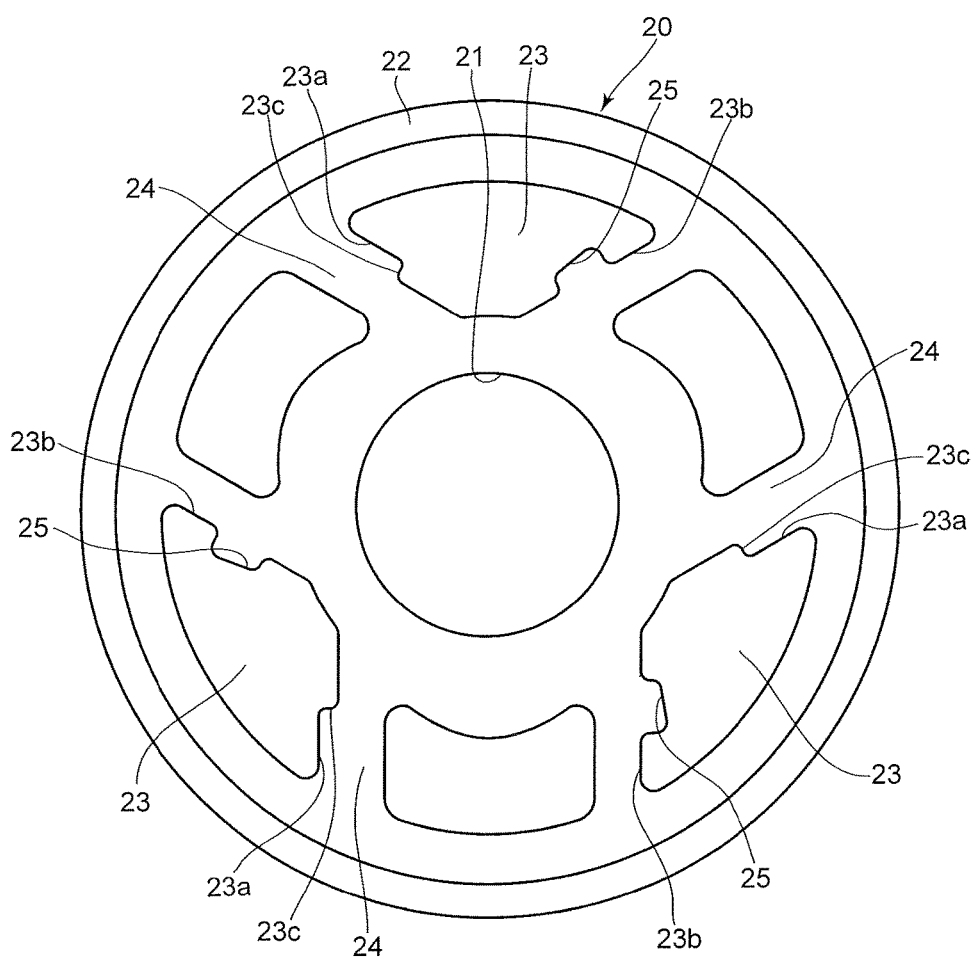
FIG. 11 is a side elevational view of a base plate which constitutes an element of the seat reclining apparatus.

The base plate 20 is a metal disk member which is formed by press molding. As shown in FIGS. 2, 7 and 11, the base plate 20 is provided in the center thereof with a shaft insertion hole 21 (opening/through-hole) formed as a through-hole which is circular in cross sectional shape. The base plate 20 is provided on the outer edge of the left side thereof with a large-diameter annular flange 22 and has an accommodation space which is formed radially inside the large-diameter annular flange 22. The base plate 20 is provided on the left side thereof with three groove-forming projections 23 which project leftward and are arranged at equi-angular intervals (intervals of 120 degrees) in the circumferential direction about the shaft insertion hole 21. Each groove-forming projection 23 is substantially in the shape of a sector having an increasing circumferential width thereof with respect to a direction from the inner peripheral side to the outer peripheral side. A circular-arc-shaped clearance is formed between the outer peripheral surface of each groove-forming projection 23 and the large-diameter annular flange 22. Both side surfaces of each groove-forming projection 23 with respect to the circumferential direction of the base plate 20 are formed as flat guide surfaces 23a and 23b. As shown in FIG. 11, the flat guide surfaces 23a and 23b (opposed surfaces) of any two adjacent groove-forming projections 23 which face each other in the circumferential direction of the base plate 20 are substantially parallel to each other, and a guide groove 24 is formed therebetween. The base plate 20 is provided, on each groove-forming projection 23 at the midpoint of the flat guide surface thereof, with a spring-engaging recess 25.

The three pawls 30, which are press-molded metal plates, are installed in the three guide grooves 24 of the base plate 20, respectively. Each pawl 30 is provided, on both sides thereon with respect to the circumferential direction, with two slide surfaces which are slidable on the associated flat guide surfaces 23a and 23b therealong. Each pawl 30 is provided on the left side surface thereof with a cam follower 32 and a holding projection 33, each of which projects leftward. The three pawls 30 are each provided on the circular-arc-shaped outer peripheral surface thereof with an outer toothed portion 34. The three pawls 30 are each provided on the inner peripheral surface thereof with a restricted portion 35 and a pressed portion 36, each of which projects toward the radially inner side.

Figure 3:
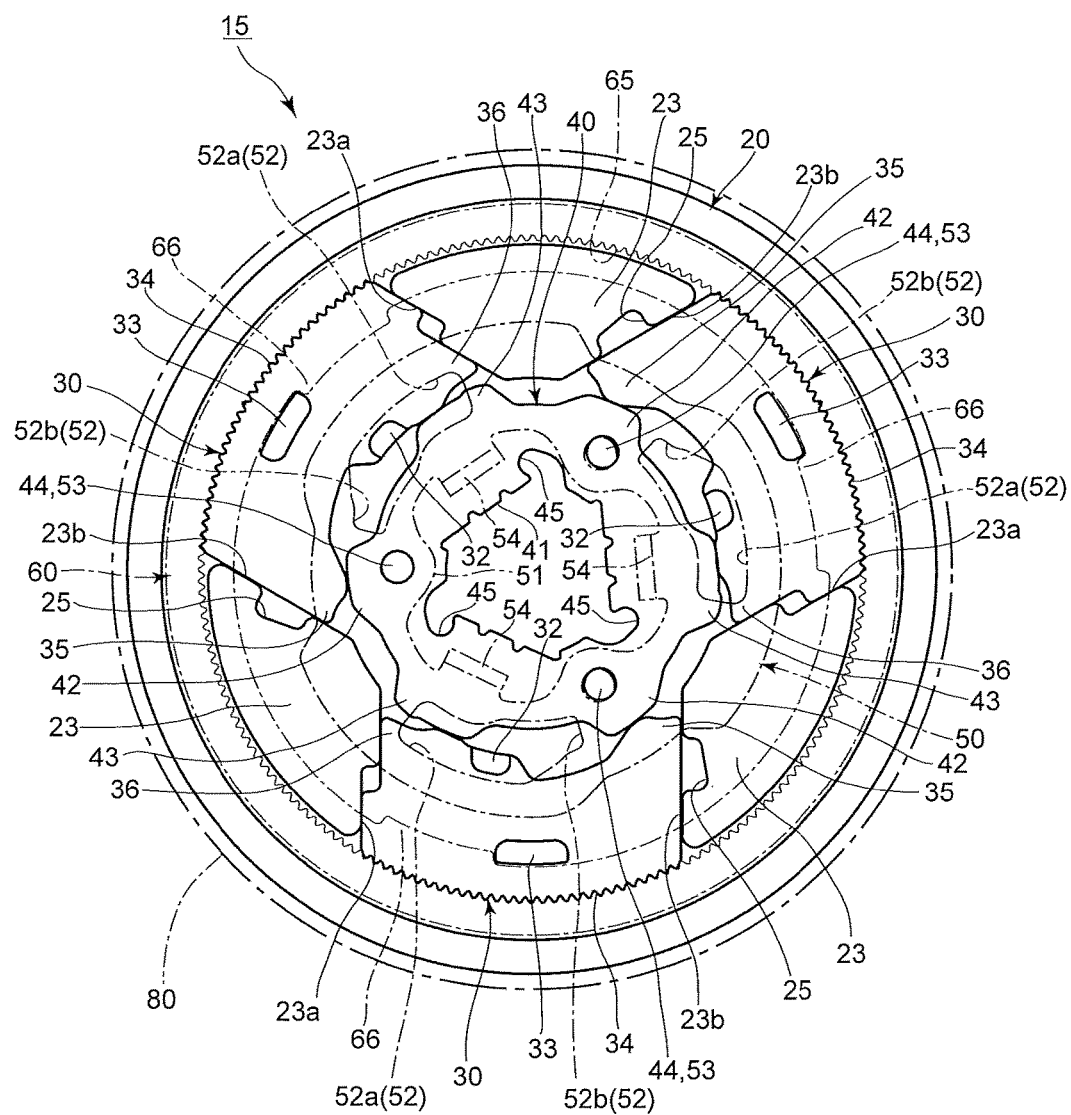
FIG. 3 is a side elevational view of the seat reclining apparatus in a locked state.
Figure 4:
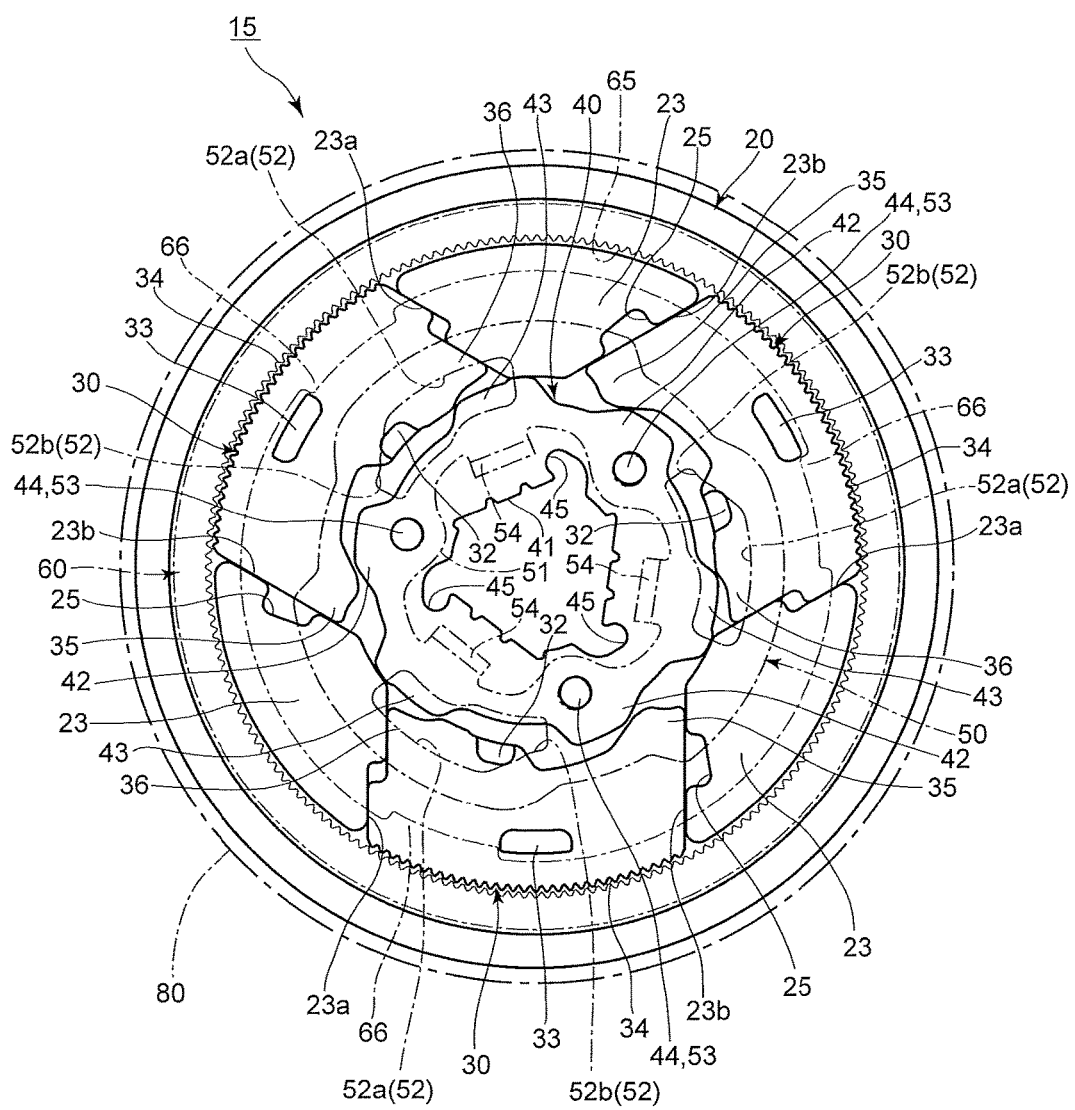
FIG. 4 is a side elevational view of the seat reclining apparatus in an unlock commencement state, i.e., a state immediately after the seat reclining apparatus starts unlocking.

The three pawls 30 are installed in the three guide grooves 24 in a manner shown in FIGS. 3 through 10. Each pawl 30 is in surface contact with the base surface (left side surface) of the associated guide groove 24 to be supported thereby. Each pawl 30 can move in a radial direction of the base plate 20 in the associated guide groove 24 along the flat guide surfaces 23a and 23b of the associated (adjacent) groove-forming projections 23. Each pawl 30 moves radially between an engaged position on the outer peripheral side (shown in FIGS. 3 and 6 through 8) in which the pawl 30 is spaced radially outwards from the shaft insertion hole 21 and in which the outer toothed portion 34 meshes with an internal gear (meshing portion) 65 of the ratchet plate 60, and a disengaged position on the inner peripheral side (shown in FIG. 5) in which the pawl 30 is positioned closest to the shaft insertion hole 21 and in which the outer toothed portion 34 is disengaged from the internal gear 65 of the ratchet plate 60. FIG. 4 shows an unlock commencement state, i.e., a state immediately after the seat reclining apparatus 15 starts unlocking. In this state, the pawl 30 has moved off the engaged position and is on the way to the disengaged position. A clearance is secured between each pawl 30 and the associated two adjacent flat guide surfaces 23a and 23b that are positioned at either side of this pawl 30. This clearance allows the pawl 30 to slide smoothly in a radial direction of the base plate 20 and prevents the pawl 30 from rattling excessively.

Figure 12:
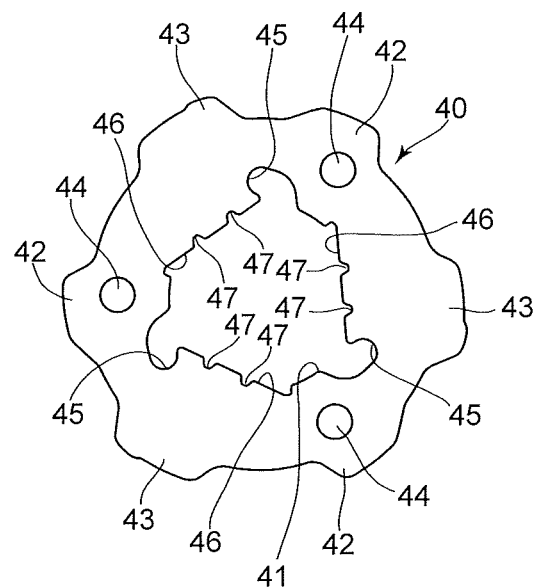
FIG. 12 is a side elevational view of a rotational cam which constitutes an element of the seat reclining apparatus.

The rotational cam 40 is a press-molded product formed of a metal plate and substantially identical in thickness to the three pawls 30. As shown in FIGS. 2 and 12, the rotational cam 40 is provided in the center thereof with a non-circular center hole (shaft coupling hole) 41, which is formed as a through-hole. The rotational cam 40 is provided, on the outer periphery thereof at substantially equi-angular intervals in the circumferential direction, with three restrictor portions 42 and provided, on the outer periphery thereof at substantially equi-angular intervals in the circumferential direction, with three pawl pressing portions 43. The rotational cam 40 is further provided, on the left side thereof at substantially equi-angular intervals in the circumferential direction, with three rotation stop projections 44. As shown in FIG. 2, the rotation stop projections 44 project leftward. The rotational cam 40 is installed in the center of the aforementioned accommodation space of the base plate 20, and the three pawls 30 are positioned radially outside the portions of the rotational cam 40 on which the three pawl pressing portions 43 are formed, respectively (see FIGS. 3 through 10).

The rotational cam 40 is provided, in the non-circular center hole 41 at substantially equi-angular intervals in the circumferential direction, with three spring-engaging recesses (engaging portions) 45. As shown in FIG. 12, the rotational cam 40 is provided in the non-circular center hole 41 with three linear (flat) inner sides 46, and the three spring-engaging recesses 45 are formed between the three inner sides 46 (namely, the three spring-engaging recesses 45 and the three inner sides 46 are alternately formed in the circumferential direction). Each spring-engaging recess 45 is open to the inner periphery of the non-circular center hole 41 and has an L-shape, which bends and extends in the circumferential direction (in the direction of travel of the rotational cam 40 toward the locked position thereof which will be discussed later). Each inner side 46 of the rotational cam 40 is provided with two pits 47.

Figure 13:
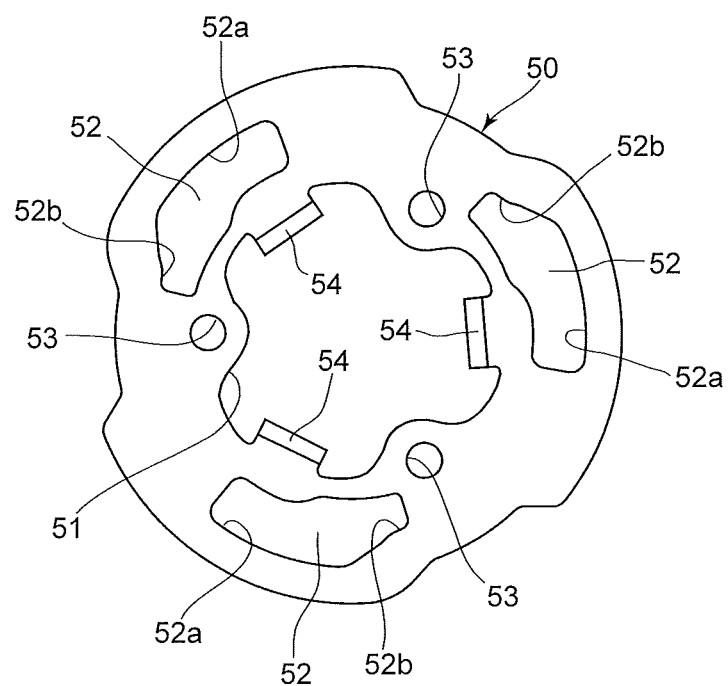
FIG. 13 is a side elevational view of a release plate which constitutes an element of the seat reclining apparatus.

The release plate 50 is a press-molded metal plate and provided, at substantially equi-angular intervals in the circumferential direction around a center hole 51 formed in the center of the release plate 50, with three cam holes 52 which are formed as through-holes as shown in FIGS. 2 and 13. The release plate 50 is provided in each cam hole 52 with a lock-allowing cam portion 52a and an unlocking cam portion 52b. The lock-allowing cam portion 52a that is provided in each cam hole 52 is formed on a portion of the release plate 50 which is farther from the center hole 51 than the unlocking cam portion 52b, thus being closer to the outer peripheral side than the unlocking cam portion 52b, while the unlocking cam portion 52b is formed on a portion of the release plate 50 which is closer to the center hole 51 than the lock-allowing cam portion 52a, thus being closer to the inner peripheral side than the lock-allowing cam portion 52a. The release plate 50 is further provided, at equi-angular intervals in the circumferential direction, with three rotation stop holes 53, and provided at the equi-angular intervals in the circumferential direction with three spring retaining projections (intermediate retaining portions) 54. Each spring retaining projection 54 is formed by bending a portion of the inner edge of the release plate 50 that defines the center hole 51. As shown in FIG. 2, each spring retaining projection 54 projects leftward.

Figure 5:
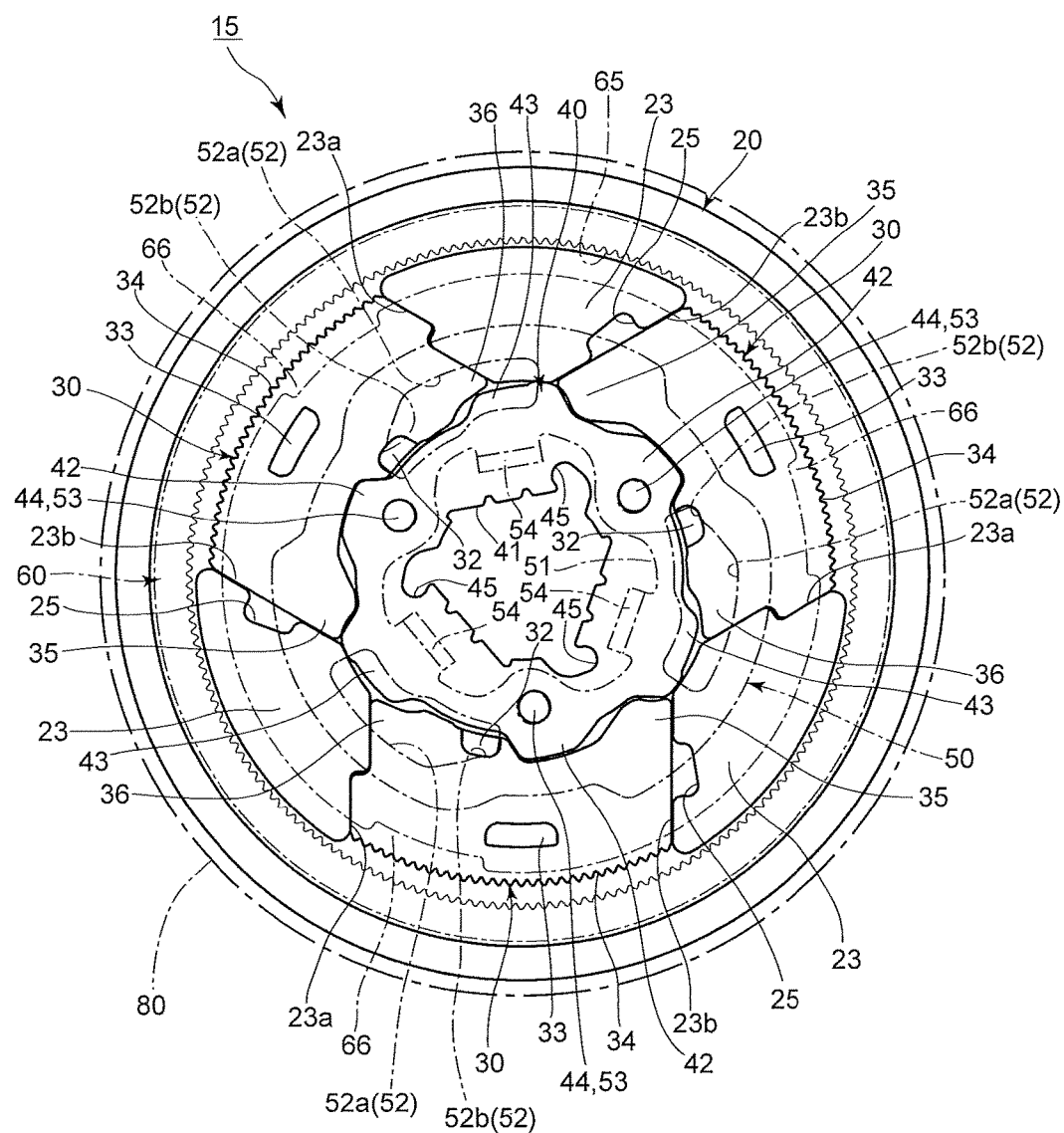
FIG. 5 is a side elevational view of the seat reclining apparatus in an unlocked state.

The release plate 50 is connected to the rotational cam 40 by fitting the three rotation stop projections 44 into the three rotation stop holes 53. The rotational cam 40 and the release plate 50 are prevented from rotating relative to each other by the engagement between the three rotation stop projections 44 and the three rotation stop holes 53, so that the rotational cam 40 and the release plate 50 integrally rotates as one. In addition, the cam followers 32 of the three pawls 30 are inserted into the three cam holes 52 of the release plate 50. As shown in FIG. 5, each pawl 30 is prevented from moving toward the inner peripheral side beyond the disengaged position by engagement of the cam follower 32 of the pawl 30 with the unlocking cam portion 52b of the associated cam hole 52. As shown in FIGS. 3 through 7, the center hole 51 of the release plate 50 is greater in size than the non-circular center hole 41 of the rotational cam 40, and the non-circular center hole 41 is not covered by the release plate 50. The three spring retaining projections 54 project toward the left side of the release plate 50 (i.e., project toward the opposite side from the side on which the rotational cam 40 is provided), thus not interfering with the pawls 30 or the rotational cam 40.

The ratchet plate 60 is a press-molded metal product which is shaped into a disk. The ratchet plate 60 is provided on the outer edge of the right side thereof with a small-diameter annular flange 61 having a circular shape which projects rightward and has an accommodation space which is formed radially inside the small-diameter annular flange 61. As shown in FIGS. 2 and 7, the ratchet plate 60 is provided at the center thereof with a shaft insertion hole (opening/through-hole) 62 formed as a through-hole which is circular in cross sectional shape. The shaft insertion hole 62 is smaller in diameter than the shaft insertion hole 21 of the base plate 20. A radially innermost portion of the ratchet plate 60 that is closest to the shaft insertion hole 62 is formed as a disk-shaped base portion 63. The ratchet plate 60 is provided at a radial position between the base portion 63 and the small-diameter annular flange 61 with an intermediate annular portion 64. As can be seen from FIG. 7, the intermediate annular portion 64 is positioned one step to the left of the small-diameter annular flange 61 and is smaller in diameter than the small-diameter annular flange 61. The ratchet plate 60 is provided on the inner peripheral surface of the small-diameter annular flange 61 with the aforementioned internal gear 65. The ratchet plate 60 is provided, on the inner peripheral surface of the intermediate annular portion 64 at equi-angular intervals in the circumferential direction, with three unlocked-state holding projections 66 which project toward the inner peripheral side. Each unlocked-state holding projection 66 is elongated in the circumferential direction of the ratchet plate 60, and the inner periphery of each unlocked-state holding projection 66 is in the shape of a circular arc with the curvature center thereof on the axis of the ratchet plate 60.

Figure 6:
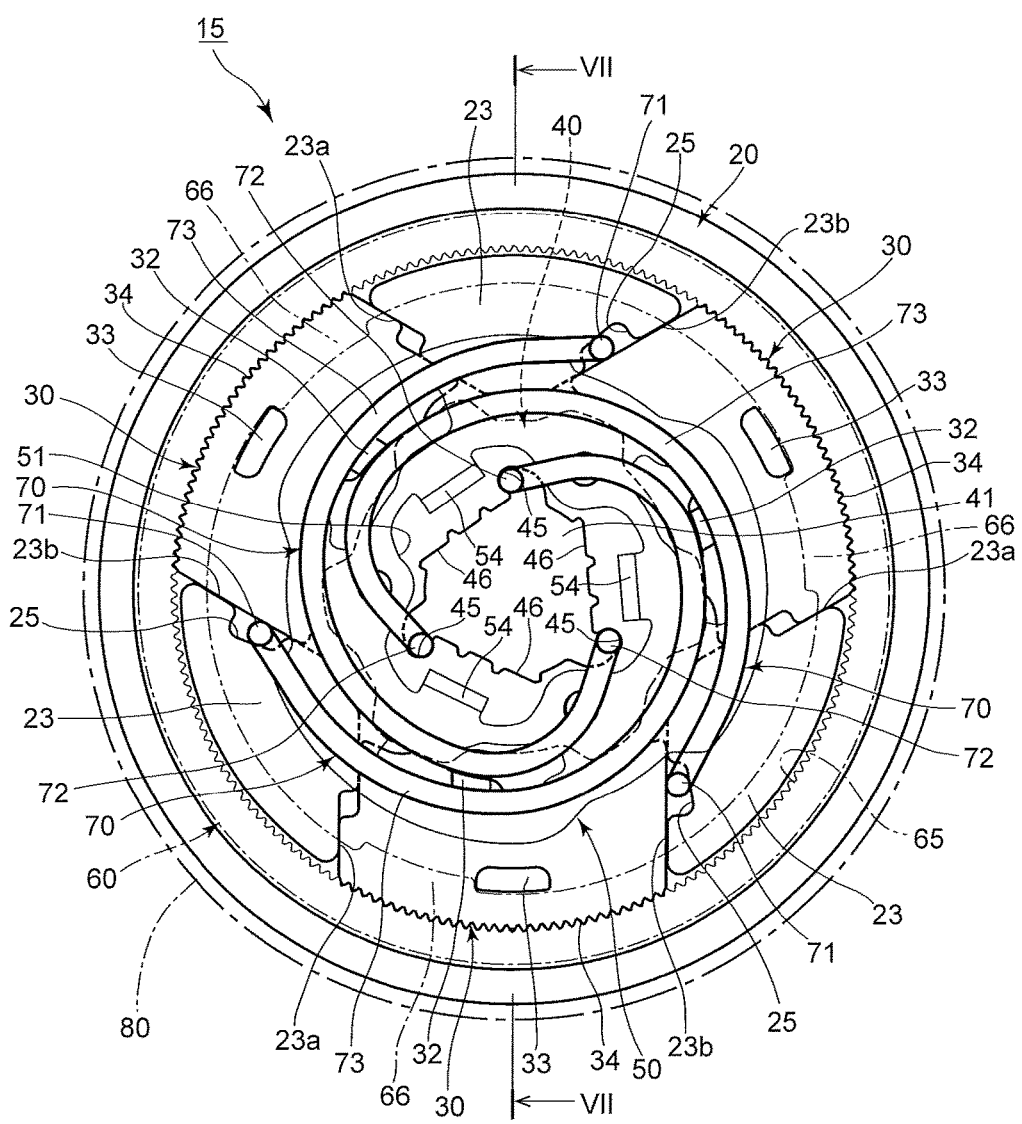
FIG. 6 is a side elevational view of the seat reclining apparatus shown in FIG. 3 to which lock springs are added.
Figure 8:
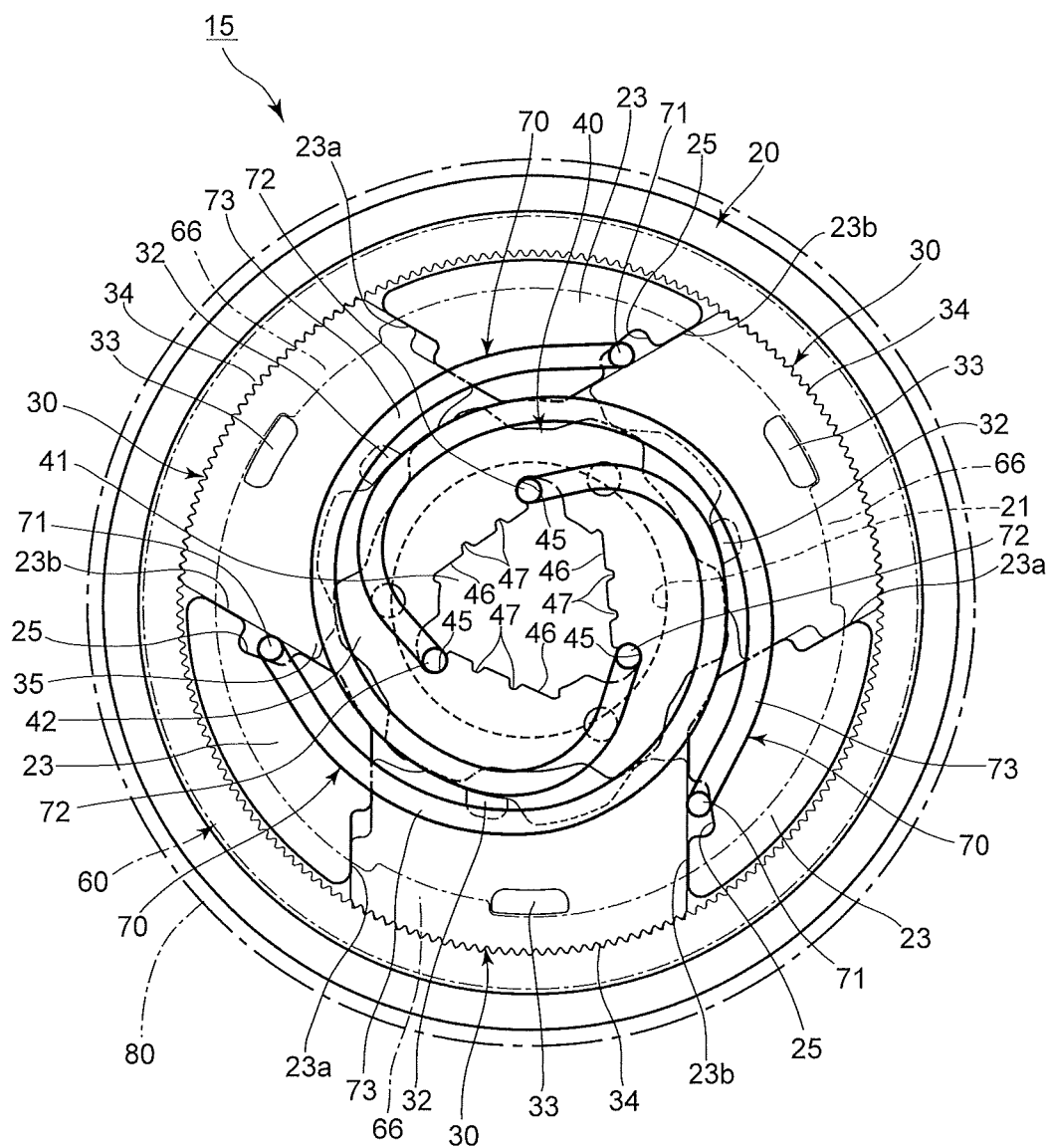
FIG. 8 is a side elevational view of the seat reclining apparatus shown in FIG. 6 from which a release plate is omitted.

The ratchet plate 60 is installed to cover the left side of the base plate 20 with the small-diameter annular flange 61 inserted into the gap between the inner periphery of the large-diameter annular flange 22 and the outer peripheries of the three groove-forming projections 23 (see FIG. 7). With the base plate 20 covered by the ratchet plate 60, the outer toothed portions 34 of the three pawls 30 radially face the internal gear 65 of the ratchet plate 60. As shown in FIGS. 6 through 8, the three lock springs 70 are installed in the space between the ratchet plate 60 and the base plate 20. As shown in FIGS. 2, 6 and 8, each lock spring 70 is made of a metal wire. One end of each lock spring 70 is bent rightward to be formed into a first hook (first connecting portion) 71, while the other end of the same is bent rightward to be formed into a second hook (second connecting portion) 72. Each lock spring 70 is provided between the first hook 71 and the second hook 72 with a curved portion 73 having the shape of a letter C. Each lock spring 70 is installed by placing the curved portion 73 on the right side of the ratchet plate 60, engaging the first hook 71 in the associated spring-engaging recess 25 of the base plate 20 and engaging the second hook 72 in the associated spring-engaging recess 45 of the rotational cam 40. With each lock spring 70 installed to the base plate 20 and the rotational cam 40 in the above described manner, each lock spring 70 is resiliently deformed to produce a biasing force that urges the rotational cam 40 to rotate in one direction. This biasing force is a force which urges the rotational cam 40 to rotate counterclockwise with respect to FIGS. 3 through 6 and 8, and this biasing force in the same direction is also exerted on the release plate 50 that is integral with the rotational cam 40 in the rotational direction.

More specifically, as shown in FIGS. 6 and 8, as viewed from the left side, each lock spring 70 has a curved shape which is curved so that the curved portion 73 extends in the counterclockwise direction with the first hook 71 as a starting point while progressively approaching the inner peripheral side and is curved so that a portion of the curved portion 73 in the vicinity of the second hook 72 increases in curvature to be directed toward the non-circular center hole 41 to reach the second hook 72 as the end point of the curve. Each spring-engaging recess 25 of the base plate 20 has a length allowing the first hook 71 of the associated lock spring 70 to move in the direction in which the associated flat guide surface 23b extends (the moving direction of the associated pawl 30 along the associated guide groove 24). On the other hand, the first hook 71 of each lock spring 70 is prevented from moving in the circumferential direction by being held between the inner surface of the associated spring-engaging recess 25 and a side of the associated pawl 30. The second hook 72 of each lock spring 70 is in a state of being pressed toward the deepest portion of associated bent-shaped spring-engaging recess 45 of the rotational cam 40. In this state, the curved portion 73 of each lock spring 70 is in a resiliently deformed state, in which the first hook 71 and the second hook 72 are more spaced apart from each other than in a free state, and the resiliency of the curved portion 73 urges the second hook 72 to press the deepest portion of the associated bent-shaped spring-engaging recess 45 further inward. This pressing force provides the rotational cam 40 with the aforementioned biasing force in the counterclockwise direction with respect to FIGS. 3 through 6 and 8.

The retaining ring 80 is an annular ring member made of metal. As shown in FIG. 7, the retaining ring 80 is fixed to the base plate 20 by covering the large-diameter annular flange 22 of the base plate 20 and the small-diameter annular flange 61 of the ratchet plate 60 with the retaining ring 80 fitted onto the outer peripheral surface of the large-diameter annular flange 22 of the base plate 20 and the left side surface of the small-diameter annular flange 61 of the ratchet plate 60. In this fixed state, the ratchet plate 60 is sandwiched between the base plate 20 and the retaining ring 80, and the ratchet plate 60 is rotatable relative to the base plate 20 along the inner peripheral surface of the large-diameter annular flange 22 without coming off the base plate 20 and the retaining ring 80.

The base plate 20 is fixed to the aforementioned pair of left and right rear frames (not shown) that are elements of the seat cushion 11, and the ratchet plate 60 is fixed to the aforementioned pair of left and right seatback frames (not shown) that are elements of the seatback 12.

An operating lever 90 (see FIG. 1) which can be manually rotated is fixed to a side (the right side) of the seat reclining apparatus 15. A shaft (rotational shaft member) 91 (see FIGS. 1 and 7) is inserted into the seat reclining apparatus 15 through the radial center thereof. The axis of the shaft 91 is substantially coincident with the rotational center of the ratchet plate 60. Manually rotating the operating lever 90 causes the shaft 91 to rotate on the axis thereof. As shown in FIG. 7, the shaft 91 passes through the shaft insertion hole 21, the non-circular center hole 41, the center hole 51 and the shaft insertion hole 62; among these holes, the shaft 91 is engaged with the non-circular center hole 41 while being prevented from rotating relative to the non-circular center hole 41. Specifically, the shaft 91 is prevented from rotating relative to the non-circular center hole 41 by being fitted to the three linear inner sides 46 of the non-circular center hole 41. The two pits 47 on each inner side 46 of the rotational cam 40 are also involved in this fit of each inner side 46 with the shaft 91. Therefore, when the shaft 91 rotates, the rotational cam 40 and the release plate 50 integrally rotate.

Operations of the seat reclining apparatus 15 that has been constructed as described above will be discussed hereinafter.

In FIGS. 3 through 5, the release plate 50, the ratchet plate 60 and retaining ring 80, which are positioned in front of the drawing sheet of paper (i.e., positioned on the left side of the pawls 30 and the rotational cam 40), are shown by imaginary lines (one-dot chain lines). Additionally, the three lock springs 70 are not shown in FIGS. 3 through 5, and FIGS. 6 through 8 show each lock spring 70 in the locked state shown in FIG. 3.

When no operating force is applied to the rotational cam 40 and the release plate 50, the seat reclining apparatus 15 is in a locked state that is shown in FIGS. 3 and 6 through 8. The positions of the rotational cam 40 and the release plate 50 at this time are referred to as the locked positions. When the seat reclining apparatus 15 is in a locked state, the rotational cam 40 and the release plate 50 are each held in the locked position by the biasing force of the three lock springs 70 (which bias the rotational cam 40 and the release plate 50 counterclockwise with respect to FIGS. 3 through 6 and 8). When the rotational cam 40 is in the locked position, the three pawl pressing portions 43 press the pressed portions 36 of the three pawls 30 in the locking direction (toward the outer peripheral side). The three pawls 30 thus pressed in the locking direction are each held in the engaged position, in which the outer toothed portion 34 of each pawl 30 is in mesh with the internal gear 65 of the ratchet plate 60, which prevents the base plate 20 and the ratchet plate 60 from rotating relative to each other. Accordingly, the seatback 12 is prevented from tilting (rotating) relative to the seat cushion 11. When the release plate 50 is in the locked position, the cam follower 32 of each pawl 30 is positioned in the lock-allowing cam portion 52a of the associated cam hole 52, and the release plate 50 is not involved in the position setting of each pawl 30. In addition, during the time each pawl 30 moves to the locked position or in the state where each pawl 30 is held in the locked position, the three restrictor portions 42 of the rotational cam 40 are not normally in contact with the restricted portions 35 of the three pawls 30; the three restrictor portions 42 of the rotational cam 40 and the restricted portions 35 of the three pawls 30 come into contact with each other only when the pawls 30 tilt.

Rotating the operating lever 90 counterclockwise with respect to FIG. 1 from the position shown by a solid line in FIG. 1 to the position shown by a two-dot chain line in FIG. 1 against the rotational biasing force of each lock spring 70 causes the rotational cam 40 and the release plate 50 to rotate clockwise with respect to FIGS. 3, 6 and 8 (in the unlocking direction) via the shaft 91 (shown in FIGS. 1 and 7). When the release plate 50 rotates in the unlocking direction from the locked position, the cam follower 32 of each pawl 30 changes the position thereof in the associated cam hole 52, which is formed in the release plate 50, from the lock-allowing cam portion 52a to the unlocking cam portion 52b thereof and is pressed toward the inner peripheral side by the inner surface of the associated cam hole 52, which causes each pawl 30 to move in the associated guide groove 24 toward the inner peripheral side. At this time, the rotational cam 40 moves to thereby move the three pawl pressing portions 43 in the direction opposite to the (pawl-pressing) direction thereof when each pawl 30 are pressed, thus not interfering with the movement of each pawl 30 that is caused by the rotation of the release plate 50 in the unlocking direction.

FIG. 4 shows the unlock commencement state, i.e., a state immediately after the seat reclining apparatus starts unlocking, specifically a state immediately after the outer toothed portion 34 of each pawl 30 starts being disengaged from the internal gear 65 of the ratchet plate 60 by a movement of each pawl 30 toward the inner peripheral side. Upon each of the rotational cam 40 and the release plate 50 rotating to the unlocked position shown in FIG. 5, each pawl 30 reaches the engagement releasing position thereof at which the outer toothed portion 34 of each pawl 30 is totally disengaged from the internal gear 65 of the ratchet plate 60. This disengagement of the outer toothed portion 34 of each pawl 30 from the internal gear 65 of the ratchet plate 60 allows the base plate 20 and the ratchet plate 60 to rotate relative to each other. Namely, the seat reclining apparatus 15 enters into an unlocked state, in which the seatback 12 can be tilted relative to the seat cushion 11. As shown in FIG. 5, when the seat reclining apparatus 15 is in an unlocked state, each of the three restrictor portions 42 of the cam member 40 (which project radially outwards) fits into a recess (which is recessed radially outwards) formed between the restricted portion 35 and the pressed portion 36 on the associated pawl 30, and each of the three pawl pressing portions 43 of the cam member 40 fits into a spaces formed between two of the three pawls 30 adjacent to each other, which makes it possible to move each pawl 30 to the engagement releasing position without being interfered by the cam member 40.

The distance between the first hook 71 and the second hook 72 of each lock spring 70 when the seat reclining apparatus 15 is in an unlocked state is greater than that when the seat reclining apparatus 15 is in a locked state (i.e., the amount of deformation of the curved portion 73 of each lock spring 70 increases when the seat reclining apparatus 15 moves from the locked state to the unlocked state), which enhances the biasing force toward the locking position which is exerted on the rotational cam 40 and the release plate 50. Therefore, upon releasing the operating lever 90 in the unlocked state shown in FIG. 5, the rotational cam 40 and the release plate 50 rotate counterclockwise toward the locked position (shown in FIGS. 3, 6 and 8) from the unlocked position by the biasing force of the each lock spring 70. This rotation of the cam ring 40 toward the locked position causes the three pawl pressing portion 43 of the cam ring 40 to press the pressed portions 36 of the three pawls 30 accordingly, thus causing each pawl 30 to move toward the outer peripheral side in the associated guide groove 24 to consequently reach the engaged position (shown in FIGS. 3 and 6 through 8).

When the holding projections 33 of the three pawls 30 and the three unlocked-state holding projections 66 of the ratchet plate 60 are positioned to face each other radially, the outer peripheral surfaces of the holding projections 33 of the three pawls 30 are engaged with the inner peripheral surfaces of the three unlocked-state holding projections 66, which prevents each pawl 30 from moving toward the outer peripheral side. At this stage, the outer toothed portion 34 of each pawl 30 and the internal gear 65 of the ratchet plate 60 are not engaged with each other, so that rotation of the ratchet plate 60 relative to the base plate 20 is not restricted. In other words, the seat reclining apparatus 15 enters into the aforementioned unlocked-state holding state (i.e., a state in which the seat reclining apparatus 15 is held in the unlocked state) even if the unlocking operation does not continue. The seat reclining apparatus 15 enters into the unlocked-state holding state when the seatback 12 is positioned in between the first-stage locked position 12C and the forwardly-tilted position 12A that are shown in FIG. 1, and the circumferential lengths and the relative position between the holding projections 33 and the three unlocked-state holding projections 66 are predetermined so as to engage with each other (radially face each other) in the range from the first-stage locked position 12C to the forwardly-tilted position 12A. Raising the seatback 12 to the first-stage locked position 12C causes the unlocked-state holding state (a state in which the holding projections 33 and the three unlocked-state holding projections 66 radially face each other) to be released, thus causing the seat reclining apparatus 15 to come into a locked state, shown in FIGS. 3 and 6 through 8, by the biasing force of each lock spring 70. When the seat reclining apparatus 15 is in a locked state, the outer peripheral surfaces of the holding projections 33 of the three pawls 30 are positioned closer to the outer peripheral side than the inner peripheral surfaces of the three unlocked-state holding projections 66.

The assembling operation of the seat reclining apparatus 15 (specifically, the installation of the three lock springs 70) will be discussed hereinafter. As shown in FIG. 7, all the three lock springs 70 are installed in the internal space of the seat reclining apparatus 15; more specifically, the curved portion 73 of each lock spring 70, which is an intermediate portion thereof that excludes the first hook 71 and the second hook 72, is positioned between the base plate 20 and the ratchet plate 60. The shaft insertion hole 21 is formed through the base plate 20 and the shaft insertion hole 62 is formed through the ratchet plate 60; however, due to constraints of the size and shape of the shaft insertion holes 21 and 62, it is difficult to install each entire lock spring 70 from the outside through the shaft insertion hole 21 or 62 with the base plate 20 and the ratchet plate 60 assembled together. Therefore, the installation of each lock spring 70 commences at a stage before the installation of the base plate 20 and the ratchet plate 60.

Figure 9:
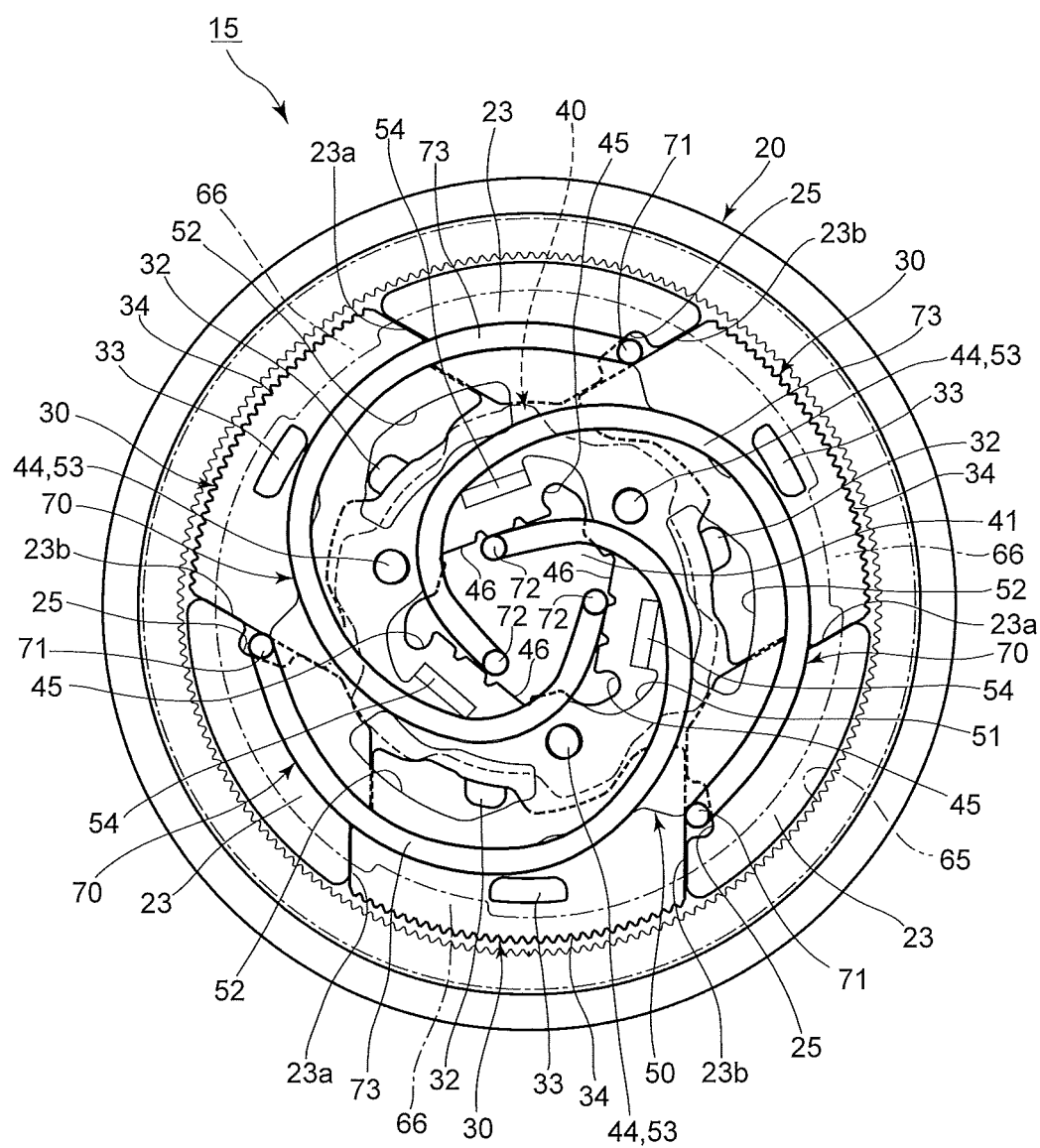
FIG. 9 is a side elevational view of the seat reclining apparatus, illustrating a method of installing the lock springs.
Figure 10:
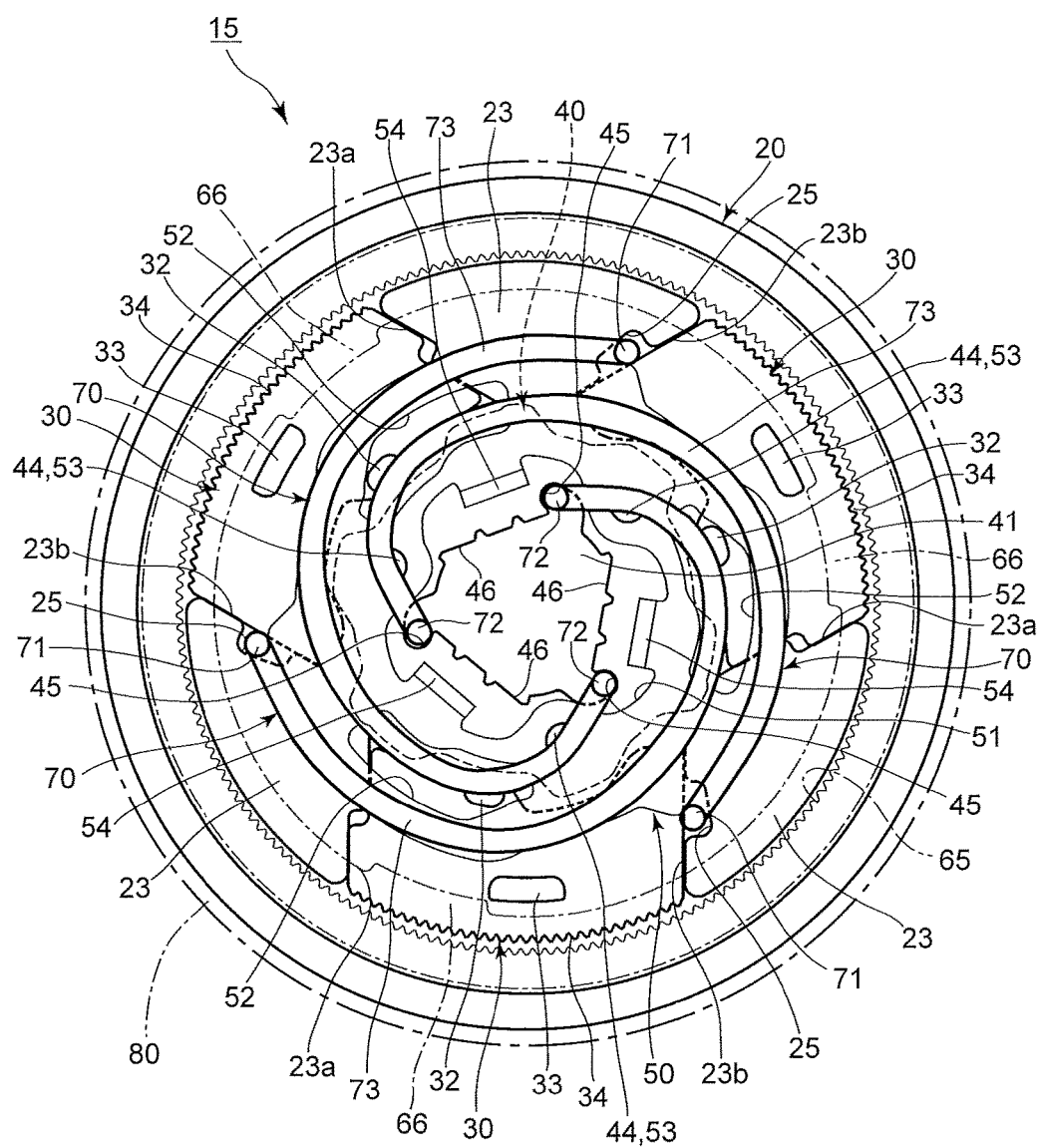
FIG. 10 is a side elevational view of the seat reclining apparatus, illustrating a method of installing the lock springs.

FIGS. 9 and 10 show the installation procedure of each lock spring 70. Each lock spring 70 is installed after the installation of the three pawls 30, the rotational cam 40 and the release plate 50 to the base plate 20. In the initial stage of the installation of the three lock springs 70, only the first hooks 71 of the three lock springs 70 are respectively inserted into (fixably connected to) the three spring-engaging recesses 25 that are formed at three different positions on the base plate 20, thereby bringing each lock spring 70 to a temporarily held state, as shown in FIG. 9, in which none of the lock springs 70 produce any biasing force. Although the ratchet plate 60 is virtually shown by one-dot chain line (imaginary line) in FIG. 9, the ratchet plate 60 is not yet installed at this stage. As described above, the first hook 71 of each lock spring 70 is prevented from moving in the circumferential direction by being held between the inner surface of the associated spring-engaging recess 25 and a side of the associated pawl 30 in a state where the pawls 30 are supported on the base plate 20. The curved portion 73 of each lock spring 70 is mounted on the release plate 50 (see FIG. 7). The portions of the curved portions 73 of the three lock springs 70 which are not overlaid on the release plate 50 face the pawls 30 or the groove-forming projections 23 with a clearance which corresponds to the thickness of the release plate 50 in the axial direction of the seat reclining apparatus 15.

As shown in FIG. 9, at the stage of temporarily holding each lock spring 70, the second hook 72 of each lock spring 70 is not brought into engagement with the associated spring-engaging recess 45 of the rotational cam 40; specifically, the second hook 72 of each lock spring 70 is temporarily inserted into the non-circular center hole 41 to be positioned in the non-circular center hole 41 except the areas of the three spring-engaging recesses 45. Since the center hole 51 of the release plate 50 is a hole (opening) that is larger than the non-circular center hole 41 of the rotational cam 40, the second hook 72 of each lock spring 70 is not prevented from being inserted into the non-circular center hole 41. As shown in FIG. 7, the length of the second hook 72 in the axial direction of the seat reclining seat 15 (the leftward and rightward directions) is greater than the sum of the thickness of the rotational cam 40 and the thickness of the release plate 50, and the end of the second hook 72 reaches the inner peripheral side of the shaft insertion hole 21 of the base plate 20. Although the seat reclining apparatus 15 with the shaft 91 inserted therethrough is shown in FIG. 7, the shaft 91 is not inserted in the assembling operation of the seat reclining apparatus 15. Therefore, even if a portion of each lock spring 70 (specifically, the second hook 72 and a portion of the curved portion 73) project to the inner peripheral side (project radially inwards) of the three linear inner sides 46 of the non-circular center hole 41 as shown in FIG. 9, neither the second hook 72 nor this portion of each lock spring 70 interferes with the shaft 91.

As shown in FIG. 9, movement of each lock spring 70 in the temporarily held state toward the inner peripheral side (diameter reduction side) is restricted by engagement of the curved portion 73 with the associated spring retaining projection 54 of the release plate 50, while movement of each lock spring 70 in the temporarily held state toward the outer peripheral side (diameter expansion side) is restricted by engagement of the curved portion 73 with the holding projection 33 of the associated pawl 30, so that each lock spring 70 does not easily come off even if the second hook 72 is not engaged in the associated spring-engaging recess 45, thus being superior in stability in the temporarily held state. The approximate position of the second hook 72 of each lock spring 70 is determined by engagement of the second hook 72 with the associated linear inner side 46; however, unlike the case where the second hook 72 of each lock spring 70 is engaged in the associated spring-engaging recess 45, each lock spring 70 does not produce a biasing force which forcefully presses the rotational cam 40 in the locking direction.

Subsequently, the ratchet plate 60 is mounted to the base plate 20 with each lock spring 70 retained in the temporarily held state. When mounting the ratchet plate 60 to the base plate 20, to prevent the ratchet plate 60 from interfering with the pawls 30, each pawl 30 is brought toward the inner peripheral side in advance by slightly rotating the rotational cam 40 and the release plate 50 in the unlocking direction. For instance, in the present embodiment of the seat reclining apparatus 15 in the state shown in FIG. 9, the rotational cam 40 and the release plate 50 have been rotated in the unlocking direction by an angle of approximately 15 degrees from the locked position. At this stage, each lock spring 70 applies no biasing force to either the rotational cam 40 or the release plate 50, so that no strong operational force is required. The above described operation to bring each pawl 30 toward the inner peripheral side can be performed at a stage before the above described stage of moving each lock spring 70 to the aforementioned temporarily held state (before the above described stage of inserting the first hook 71 of each lock spring 70 into the associated spring-engaging recess 25).

After the ratchet plate 60 is mounted to the base plate 20, the ratchet plate 60 retained by the retaining ring 80. The retaining ring 80 enables a side (specifically the left side) of each lock spring 70 to be covered and held by the ratchet plate 60, and the ratchet plate 60 is prevented from coming off the base plate 20, which prevents each lock spring 70 from dropping out of the internal space between the base plate 20 and the ratchet plate 60 (see FIG. 7).

Lastly, the second hook 72 of each lock spring 70 is brought into engagement in the associated spring-engaging recess 45 to be fixed thereto to thereby bring each lock spring 70 to a biasing state (energizing state/installation completion state) from the temporarily held state as shown in FIG. 10. Although each of the ratchet plate 60 and the retaining ring 80 is virtually shown by one-dot chain line (imaginary line) in FIG. 10, the installation of the ratchet plate 60 and the retaining ring 80 has been already completed at this stage. Since the end of the second hook 72 has reached the inner peripheral side of the shaft insertion hole 21 of the base plate 20 with the second hook 72 of each lock spring 70 temporarily held in the non-circular center hole 41 (held on the radially inner side of the three linear inner sides 46) as described above (see FIG. 7), the operation to engage the second hook 72 of each lock spring 70 in the associated spring-engaging recess 45 can be performed by making an access to the second hook 72 of each lock spring 70 from the right side through the shaft insertion hole 21. As shown in FIGS. 7 and 8, the shaft insertion hole 21 is a hole (opening) greater than the non-circular center hole 41, so that the whole of the non-circular center hole 41, which includes the three spring-engaging recesses 45, can be visually identified through the shaft insertion hole 21; hence, the operation to engage the second hook 72 of each lock spring 70 in the associated spring-engaging recess 45 (the operation to fix the second hook 72 of each lock spring 70 to the associated spring-engaging recess 45) can be performed with efficiency without being interfered with the base plate 20. Since not only the second hook 72 of each lock spring 70 but also a portion of the curved portion 73 of each lock spring 70 are located at positions visible through the non-circular center hole 41 when each lock spring 70 is in the temporarily held state as shown in FIG. 9, it is possible to engage (fix) the second hook 72 of each lock spring 70 with (to) the associated spring-engaging recess 45 while holding a portion of the curved portion 73 of the same lock spring 70 instead of directly holding the second hook 72 of the same lock spring 70.

Additionally, since the second hook 72 of each lock spring 70 and a portion of each curved portion 73 are located at positions visible also from the shaft insertion hole 62 side of the ratchet plate 60, the operation to engage the second hook 72 of each lock spring 70 in the associated spring-engaging recess 45 can also be performed by making access to the second hook 72 of each lock spring 70 from the left side through the shaft insertion hole 62. In the present embodiment of the seat reclining apparatus 15, from conditions such as the difference in size between the shaft insertion holes 21 and 62 and the positional relationship with the second hook 72, engaging the second hook 72 of each lock spring 70 with (fixing the second hook 72 of each lock spring 70 to) the associated spring-engaging recess 45 through the shaft insertion hole 21 as described above is superior in workability to that through the shaft insertion hole 62; however, it is possible to improve the accessibility to each lock spring 70 from the shaft insertion hole 62 side by, e.g., increasing the diameter of the shaft insertion hole 62.

The amount of deformation of the curved portion 73 of each lock spring 70 increases by engaging the second hook 72 of the same lock spring 70 in the associated spring-engaging recess 45 (by fixing the second hook 72 of the same lock spring 70 to the associated spring-engaging recess 45), which makes each lock spring 70 function as a biaser that biases the rotational cam 40 and the release plate 50. The operation to engage the second hook 72 of each lock spring 70 in the associated spring-engaging recess 45 (the operation to fix the second hook 72 of each lock spring 70 to the associated spring-engaging recess 45) is performed with a side (specifically the left side) of each lock spring 70 covered by the ratchet plate 60, there is no possibility of the second hook 72 of each lock spring 70 coming off to the side, which saves the worker/technical from the trouble of holding each lock spring 70 from the side. Accordingly, each lock spring 70 can be easily and securely made to move from the temporarily held state to the biasing state (installation completion state).

As described above, according to the seat reclining apparatus producing method of the present invention, the workability of assembling the seat reclining apparatus 15, in which the lock springs 70 are arranged in the internal space between the base plate 20 and the ratchet plate 60, is improved. Specifically, the ratchet plate 60 is installed in the temporarily held state, in which each lock spring 70 produces no strong biasing force, and each lock spring 70 is made to move from the temporarily held state to the biasing state after each lock spring 70 is prevented from coming off by the installation of the ratchet plate 60. Accordingly, the load on the operation to install each lock spring 70 is reduced at any stage, and each lock spring 70, which is of a built-in type, can be installed quite easily.

Although the present invention has been described based on the above illustrated embodiment of the seat reclining apparatus, the present invention is not limited solely to this particular embodiment; various modifications to the above illustrated embodiment of the seat reclining apparatus is possible.

For instance, the biasing members of the seat reclining apparatus 15 are configured as the three lock springs 70, each of which is formed into a curved wire shape; however, the present invention is also applicable to a seat reclining apparatus provided with biasing members in a different form. As a specific example, a seat reclining apparatus using a coil spring (helical spring) which is made by winding multiple turns of a metal wire is known in the art; the production method according to the present invention can be applied to this type of seat reclining apparatus.

Although the second hook 72 of each lock spring 70 is connected to (engaged with) the rotational cam 40, which presses each pawl 30 toward the engaged position in the above illustrated embodiment, it is also possible to connect (engage) a portion of each biasing member which corresponds to the second hook 72 of each lock spring 70 to (with) the release plate 50 on condition that each biasing member can move from the temporarily held state to the biasing state after the ratchet plate 60 is mounted to the base plate 20. Since the rotational cam 40 and the release plate 50 rotate integrally, the biasing force of each biasing member can be applied to the rotational cam 40 even when the object to which each biasing member is to be directly connected is either of the rotational cam 40 and the release plate 50.

In the above illustrated embodiment, the operation to engage the second hook 72 of each lock spring 70 in the associated spring-engaging recess 45 of the rotational cam 40 is performed through the shaft insertion hole 21 of the base plate 20 (or through the shaft insertion hole 62 of the ratchet plate 60). The shaft insertion holes 21 and 62 are provided as portions through which the shaft 91 is inserted; however, by using the shaft insertion holes 21 and 62 also as work openings for the operation to engage the second hook 72 of each lock spring 70 in the associated spring-engaging recess 45, the advantage of no additional opening being required to be formed on either of the base plate 20 and the ratchet plate 60 is obtained. In addition, since the shaft insertions holes 21 and 62 are formed on the inner peripheral side of the seat reclining apparatus 15, it is logical for the shaft insertion holes 21 and 62 to be used as the work openings also in terms of easiness of access to the area in the vicinity of the second hooks 72 of the three lock springs 70. However, in a different embodiment of the seat reclining apparatus which is different in, e.g., the shape of each biasing member, forming the work openings at positions different from the positions of the shaft insertion holes 21 and 62 is also possible.

The above illustrated embodiment of the seat reclining apparatus 15 is provided with the three spring retaining projections 54 as the intermediate retaining portions that retain the curved portions 73 of the three lock springs 70 in the temporarily held state; however, intermediate retaining portions provided at different positions or formed on different members can be used instead. For instance, the rotation stop projections 44 that are provided on the rotational cam 40 project in the same direction (leftward) as the spring retaining projections 54; if the positions of the rotation stop projections 44 and the shape of each lock spring 70 satisfy predetermined conditions, the rotation stop projections 44 can also be used as the aforementioned intermediate retaining portions. In such a case, the three rotation stop projections 44 would be required to have an increased amount of projection so as to project to the left of the release plate 50 to be capable of contacting the three lock springs 70.

In the above illustrated embodiment, the base plate 20 is provided, on each of the three groove-forming projections 23 at the midpoint of the flat guide surface thereof, with one spring-engaging recess 25 as a portion to which the first hook 71 of the associated lock spring 70 is fixably connected; however, it is also possible to provide this portion, to which the first hook 71 of the associated lock spring 70 is fixably connected, on the inside of each groove-forming projection 23, instead of providing the three spring-engaging recesses 25.

In the above illustrated embodiment, when installing each lock spring 70, firstly the first hook 71 is connected to the associated spring-engaging recess 25 of the base plate 20, and subsequently the second hook 72 is fixed to the associated spring-engaging recess 45 of the rotational cam 40; however, this structure is reversible; namely, it is possible to firstly connect the second hook 72 to the associated spring-engaging recess 45 of the rotational cam 40 and subsequently fix the first hook 71 to the associated spring-engaging recess 25 of the base plate 20. In other words, when each biasing member (each lock spring 70) is made to move into the temporarily held state, either of the two connecting portions (the first hook 71 and the second hook 72) can be connected first.

Inversely to the structure of the above illustrated embodiment, the production method according to the present invention can also be applied to a different type of seat reclining apparatus in which the base plate 20 and the ratchet plate 30 are fixed to a frame on the seatback 12 side and a frame on the seat cushion 11 side, respectively.

Among all the left and right frames provided as elements of the seat cushion 11 and the seatback 12, the seat cushion frame and the seatback frame on the right side facing forward are connected via the seat reclining apparatus 15 in the above illustrated embodiment; however, the production method according to the present invention can be applied to a type of seat reclining apparatus in which the seat cushion frame and the seatback frame on the left side facing forward can be connected via the seat reclining apparatus 15.

Additionally, the production method according to the present invention can be applied to a type of seat reclining apparatus in which the right rear frame of the seat cushion 11 and the right seatback frame are connected to each other via the seat reclining apparatus (right seat reclining apparatus) 15, in which the left rear frame of the seat cushion 11 and the left seatback frame are connected to each other via a left seat reclining apparatus bisymmetrically identical to the right seat reclining apparatus 15 and in which the rotational cam 40 of the right seat reclining apparatus 15 and the rotational cam (which corresponds to the rotational cam 40) of the left seat reclining apparatus are connected to each other via a connecting pipe, or the like, so that the left and right seat reclining apparatuses move in synchronization with each other.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A method of producing a seat reclining apparatus which enables an angle of a seatback of a reclining seat relative to a seat cushion of said reclining seat to be adjusted, said seat reclining apparatus including a base member which is provided on one of said seat cushion and said seatback; a ratchet which is provided on the other of said seat cushion and said seatback and allowed to rotate relative to said base member and has a meshing portion; a lock member which is supported by said base member so as to be movable between an engaged position, in which said lock member is engaged with said meshing portion of said ratchet, and a disengaged position, in which said lock member is disengaged from said meshing portion of said ratchet; a lock drive member configured to operate selectively in a locking direction to move said lock member to said engaged position and an unlocking direction to move said lock member to said disengaged position in accordance with rotation of a rotational shaft member; and a biasing member which is disposed in a space between the ratchet and the base member and includes a first connecting portion and a second connecting portion which are fixed to said base member and said lock drive member, respectively, and biases said lock drive member in said locking direction in a biasing state in which said first connecting portion and said second connecting portion are fixed to said base member and said lock drive member, respectively, wherein said angle of said seatback relative to said seat cushion varies by rotation of said ratchet relative to said base member, and said method of producing a seat reclining apparatus comprising:

connecting one of said first connecting portion and said second connecting portion to associated one of said base member and said lock drive member, with said lock member and said lock drive member supported on said base member, thereby bringing said biasing member to a temporarily held state;

mounting said ratchet to said base member so as to cover said biasing member in said temporarily held state; and fixing the other of said first connecting portion and said second connecting portion to the other of said base member and said lock drive member through an opening which is formed in one of said base member and said ratchet, thereby bringing said biasing member to said biasing state from said temporarily held state.

2. The method of producing a seat reclining apparatus according to claim 1, wherein each of said base member and said ratchet is provided with a through-hole through which said rotational shaft member is inserted, wherein said connecting, by which said biasing member is brought to said temporarily held state, comprises connecting said first connecting portion to said base member, wherein said fixing, by which said biasing member is brought to said biasing state, comprises fixing said second connecting portion to said lock drive member, and wherein said method of producing a seat reclining apparatus further comprises:

moving said biasing member to said biasing state from said temporarily held state using one of said through-holes of said base member and said ratchet as said opening.

3. The method of producing a seat reclining apparatus according to claim 2, wherein said biasing member comprises a spring provided with a curved portion having a curved wire shape which varies a curvature thereof when resiliently deformed, wherein said first connecting portion and said second connecting portion are provided at one end and the other end of said curved portion, wherein said lock drive member is provided with a shaft coupling hole into which said rotational shaft member is inserted in a manner such that said rotational shaft member is capable of rotating integrally with said lock drive member, and wherein said lock drive member is provided with an engaging portion which is formed as a depression that is open to an inner periphery of said shaft coupling hole, and to which said second connecting portion of said biasing member is fixed, wherein said connecting, by which said biasing member is brought to said temporarily held state, comprises inserting said second connecting portion into said shaft coupling hole at a position other than a position of said engaging portion.

4. The method of producing a seat reclining apparatus according to claim 3, wherein said connecting, by which said biasing member is brought to said temporarily held state, comprises retaining said curved portion of said biasing member via an intermediate retaining portion which is provided on said lock drive member.

* * * * *